United States Patent
Shankar et al.

(10) Patent No.: US 11,981,111 B2
(45) Date of Patent: May 14, 2024

(54) AUXETIC MEMBER FOR LOAD BEARING STRUCTURES

(71) Applicant: Amrita Vishwa Vidyapeetham, Tamil Nadu (IN)

(72) Inventors: Balakrishnan Shankar, Kerala (IN); Hariprasad Mohan Prasanna, Kerala (IN); Shammo Dutta, Pune (IN); Hrishikesh Gopakumar Menon, Mumbai (IN)

(73) Assignee: Amrita Vishwa Vidyapeetham (IN)

( * ) Notice: Subject to any disclaimer, the term of this patent is extended or adjusted under 35 U.S.C. 154(b) by 249 days.

(21) Appl. No.: 17/404,733

(22) Filed: Aug. 17, 2021

(65) Prior Publication Data

US 2022/0410524 A1    Dec. 29, 2022

(30) Foreign Application Priority Data

Jun. 24, 2021    (IN) ............................ 202143028398

(51) Int. Cl.
| | | |
|---|---|---|
| *B32B 3/18* | (2006.01) | |
| *B32B 1/00* | (2006.01) | |
| *B32B 3/26* | (2006.01) | |
| *B32B 3/30* | (2006.01) | |
| *B32B 7/022* | (2019.01) | |

(52) U.S. Cl.
CPC ................ *B32B 3/18* (2013.01); *B32B 1/00* (2013.01); *B32B 3/26* (2013.01); *B32B 3/30* (2013.01); *B32B 7/022* (2019.01); *B32B 2307/546* (2013.01); *Y10T 428/2457* (2015.01)

(58) Field of Classification Search
CPC .... B32B 1/00; B32B 3/18; B32B 3/26; B32B 3/30; B32B 7/022; B32B 2307/546; Y10T 428/2457

See application file for complete search history.

(56) References Cited

U.S. PATENT DOCUMENTS

| | | | | |
|---|---|---|---|---|
| 2014/0161601 A1* | 6/2014 | Geiger | .................. | F01D 21/045 |
| | | | | 415/213.1 |
| 2016/0375648 A1* | 12/2016 | Adams | .................. | F41H 5/0492 |
| | | | | 428/117 |

FOREIGN PATENT DOCUMENTS

CN        104763772 A    *    7/2015

OTHER PUBLICATIONS

Translation of CN104763772A. (Year: 2015).*

* cited by examiner

*Primary Examiner* — Catherine A. Simone
(74) *Attorney, Agent, or Firm* — Donald R. Boys; Central Coast Patent Agency LLC (57) ABSTRACT

An auxetic member for load bearing structures has a section including a plurality of structural units, and a top layer provided at a top end of the section and a bottom layer provided at a bottom end of the section. The structural units includes ribs with parallel surfaces and ribs with re-entrant surfaces and the ribs with parallel surfaces of the structural units are oriented at an angle α relative to a horizontal plane, the structural unit including a void enclosed by the ribs with parallel surfaces and ribs with re-entrant surfaces. The member is characterized in that the void of the structural units is filled with a packing material for improving load bearing capacity.

8 Claims, 9 Drawing Sheets

AUXETIC MEMBER FOR LOAD BEARING STRUCTURES

CROSS REFERENCE TO RELATED APPLICATIONS

The present application claims priority to Indian Application 202143028398 filed 24 Jun. 2021. All disclosure of the parent application is incorporated at least by reference.

BACKGROUND OF THE INVENTION

1. Field of the Invention

The embodiments herein generally relate to load bearing structures. More particularly, the disclosure relates to structural units for sustainable load bearing support.

2. Description of Related Art

A majority of the structures that one deals with in our day-to-day lives are seen to obey the conventional relation that is lateral compression under a tensile load and vice versa. On the contrary, structures with negative Poisson's ratio are termed as auxetics. With advancements in topology of structural aspects, researchers have managed to fabricate/modify the geometries of certain structures incorporating negative or zero Poisson's ratio, which has several engineering advantages.

Advancements in manufacturing technologies and optimized auxetic structures are being pursued in view of the engineering advantages. Presence of negative Poisson's ratio behaviour in nature has provided the lead to mankind in designing these kinds of structures artificially. Since auxetic structures possess negative Poisson's ratio, they can be exploited in many engineering applications. One such advantage is that of high local indentation resistance to an externally applied force. Some of the landmark improvements in such structures to their conventional counterparts are with respect to that of thermal/shock resistance, fracture toughness and shear modulus. A large range of auxetic foams and textiles used in sports attires are already brought into use. Auxetics obtain their peculiarities from their constituent geometry. One such geometrical variation of the conventional honeycomb is referred as re-entrant honeycomb, which is auxetic in nature. Studies have shown that the behaviours of such structures are the result of interplay of their material microstructure and their geometrical macrostructure. Majority of the work on auxetics are focused more toward its Poisson's ratio aspect and has overlooked the possibilities of utilizing the auxetic designs as load bearing structures. The potential of auxetic structures has not been investigated to its full capacity for its load bearing capabilities.

Therefore, there is a need for load bearing support structures aimed towards forming a sustainable structural design with reduced weight and improved deformation resistance. Moreover, there is a need for an auxetic structural member providing improved load bearing properties.

OBJECTS OF THE INVENTION

Some of the objects of the present disclosure are described herein below:
The main objective of the present disclosure is to provide an auxetic member for load bearing structures. Another objective of the present disclosure is to provide an auxetic member with improved deflection characteristics under bending conditions. Still another objective of the present disclosure is to provide an auxetic member with reduction in weight for reducing wastage of materials. Yet another objective of the present disclosure is to provide an auxetic member for load bearing structures with customizable re-entrant auxetic sections. The other objectives and advantages of the present disclosure will be apparent from the following description when read in conjunction with the accompanying drawings, which are incorporated for illustration of preferred embodiments of the present disclosure and are not intended to limit the scope thereof.

BRIEF SUMMARY OF THE INVENTION

In accordance with an embodiment of the invention, the auxetic member comprises a section including a plurality of structural units, a top layer provided at a top end of the section and a bottom layer provided at a bottom end of the section. The structural unit includes ribs with parallel surfaces and ribs with re-entrant surfaces. The ribs with parallel surfaces of the structural units are oriented at an angle $\alpha$ relative to a horizontal plane and the structural unit includes a void enclosed by the ribs with parallel surfaces and ribs with re-entrant surfaces. The void of the structural units is filled with a packing material for improving load bearing capacity.

In accordance with an embodiment, Young's modulus of the packing material is lower than the Young's modulus of material of the ribs. In accordance with an embodiment, the auxetic member includes a plurality of sections. In an embodiment, the top layer including a wall thickness (f), the bottom layer including a wall thickness (b) and the sections including a thickness (w). In an embodiment, the wall thickness (f) and the wall thickness (b) are different between different auxetic members and the thickness (w) is different between the plurality of sections of the auxetic member.

In an embodiment, the angle $\alpha$ is different between the structural units of different sections for improving load distribution. In an embodiment, the structural unit includes parameters of cell angle ($\theta$), rib thickness (t), slant rib length (l) and horizontal rib length (h) and the parameters are variable between the structural units of different sections. In accordance with an embodiment, a layer of homogenous material having a thickness is provided between the sections for separating and binding the sections with structural units of different angle $\alpha$. In an embodiment, the thickness is different between the layers based on orientation of the structural units and binding between the sections.

In accordance with an embodiment, the packing material is different between the structural units of different sections. In an embodiment, the packing material is filled in the voids of all the structural units of the section.

In accordance with an embodiment, the packing material is filled in the voids of few of the structural units of the section for reducing total weight. In an embodiment, the packing material bonds with ribs of the void wherein the packing material is chemically reactive towards material of the ribs, thereby forming a stable bond. In an embodiment, the packing material filled in the void is disjoint from the ribs of the void.

These and other aspects of the embodiments herein are better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to provide load bearing support structures aimed towards forming a sustainable structural design with reduced weight and improved deformation resistance. In particular, there is a need to provide an auxetic structural member having improved load bearing properties with less mass consumption. The embodiments herein achieve this by providing "An auxetic member for load bearing structures". Referring now to the drawings, and more particularly to FIG. 1A through FIG. 7B, where similar reference characters denote corresponding features consistently throughout the figures, there are shown preferred embodiments.

Figure 1A:
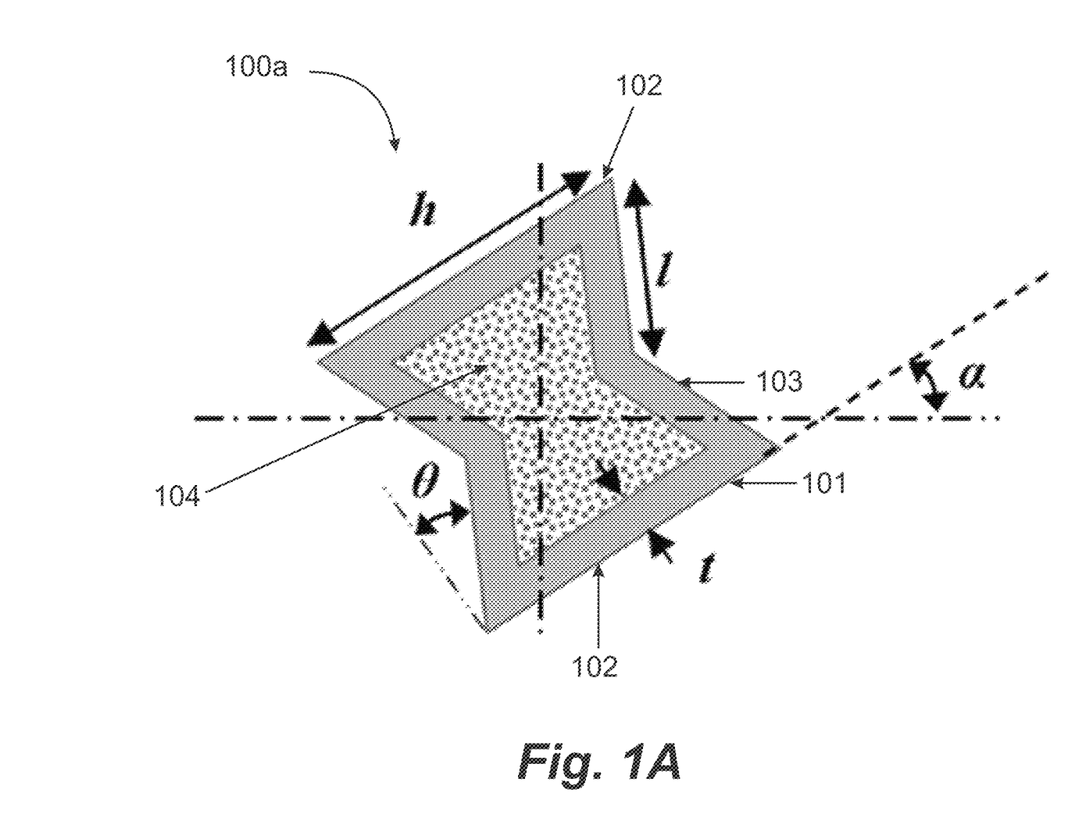
FIG. 1A illustrates a structural unit of an auxetic structural member, according to an embodiment of the present invention.

FIG. 1A illustrates a structural unit of an auxetic structural member. The structural unit 101 includes two ribs 102 having parallel surfaces and two ribs 103 having re-entrant surfaces. The pair of ribs 103 having re-entrant surfaces are responsible for auxetic behavior of the structural unit 101. The structural unit 101 includes a void between the pair of ribs 103 having re-entrant surfaces and the pair of ribs 102 having parallel surfaces. The structural unit (101) is made of a material including but not limited to metals and polymers.

The void is filled with a packing material 104 for improving load bearing capacity of the structural unit 101. In an embodiment, the packing material 104 is injected completely in an area of the void of the structural unit 101 or the packing material 104 is injected partially in the area of the void of the structural unit 101.

In an embodiment, the packing material 104 is filled in the void wherein the packing material is fixed to the boundaries of the structural units 101. Fixing the material to the boundaries of the void is achieved by substance of the pairs of ribs 102, 103 being chemically active towards the packing material to be filled and capable of forming a stable bond. In another embodiment, the packing material 104 is filled in the void while being disjoint to the boundaries of the void inside the structural unit 101.

In an embodiment, the packing material (104) controls load bearing capacity and mass consumption. The packing material (104) is selected from Solids/semi-solids/liquids with relatively higher Young's modulus (but lower than that of material of the structural unit (101)). Packing material with an appropriate Young's modulus is chosen so as to provide maximum strength yet maintaining lower overall mass consumption. In an embodiment, the packing material includes but not limited to a homogeneous material and a functionally graded material. In an embodiment, the structural unit 101 includes dimensional parameters of cell angle 'θ', rib thickness 't', slant rib length 'l', horizontal rib length 'h' and angle 'α'.

Figure 1B:
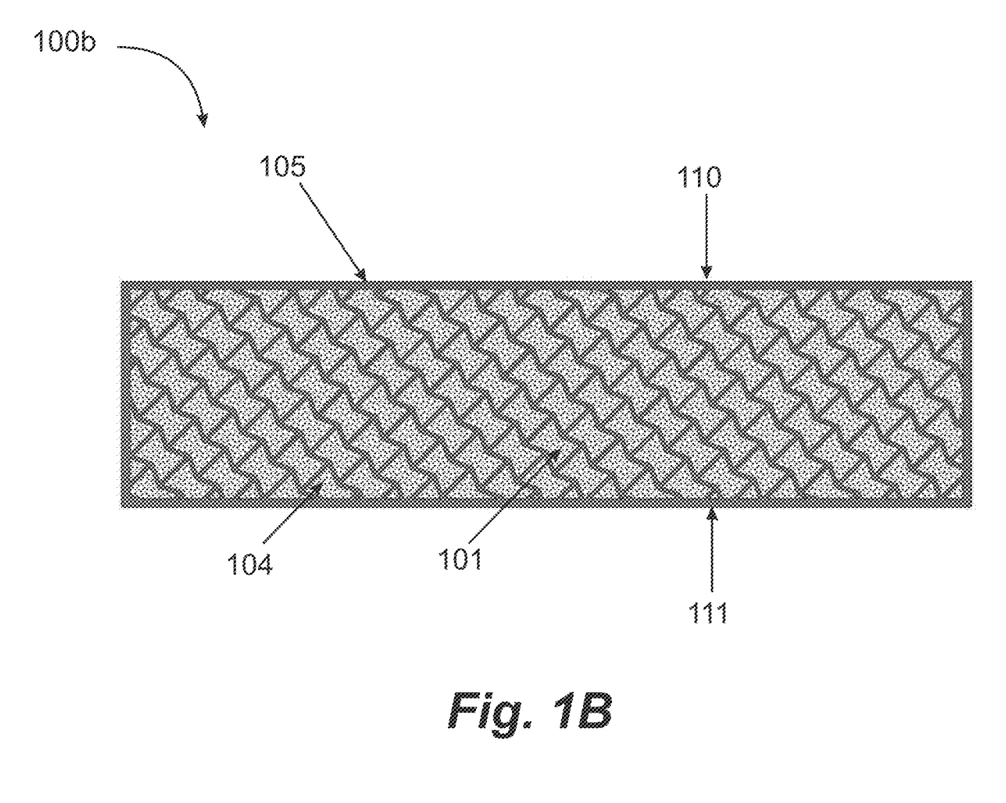
FIG. 1B illustrates a section of an auxetic structural member, according to an embodiment of the present invention.

FIG. 1B illustrates a section of an auxetic structural member. The section 105 includes a plurality of structural units 101, a top layer 110 and a bottom layer 111. The plurality of structural units 101 are linked together for forming the section. A homogenous material is provided as the top layer 110 and the bottom layer 110. The thickness of the top layer 110 and the bottom layer 111 are variable based on requirement. The dimensional parameters of the structural units 101 are variable in different sections of the auxetic structural member.

Figure 2A:
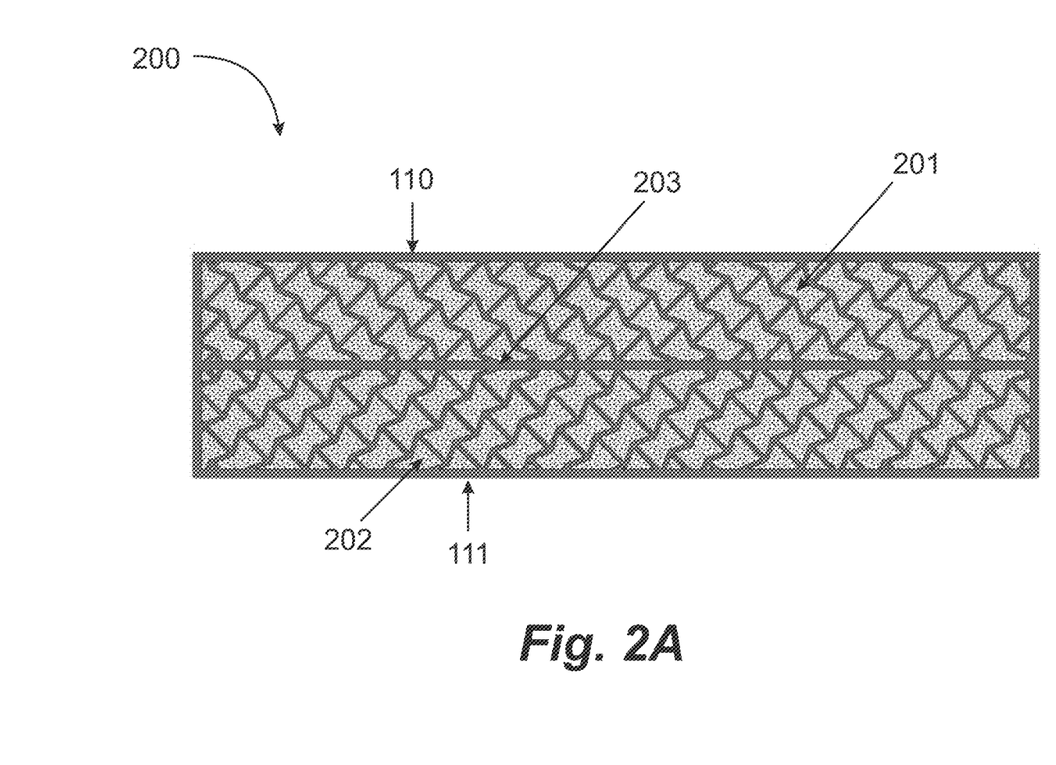
FIG. 2A illustrates an auxetic structural member having sections of different orientations, according to an embodiment of the present invention.
Figure 2B:
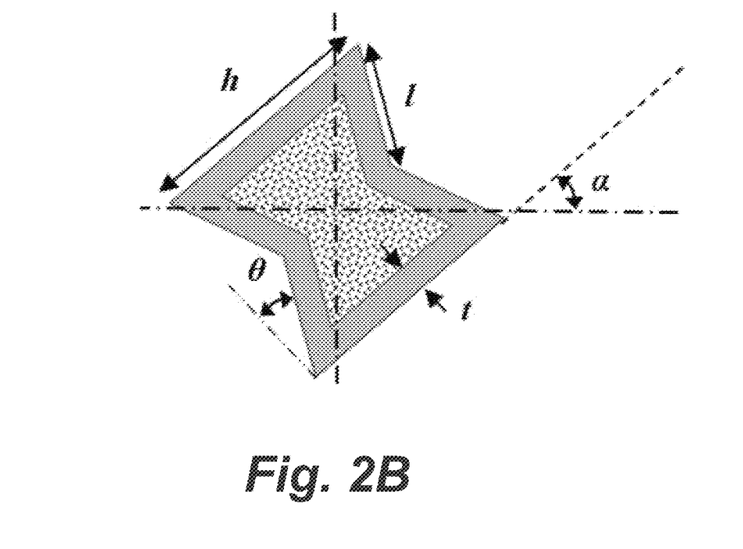
FIG. 2B illustrates a structural unit of the first section, according to an embodiment of the present invention.
Figure 2C:
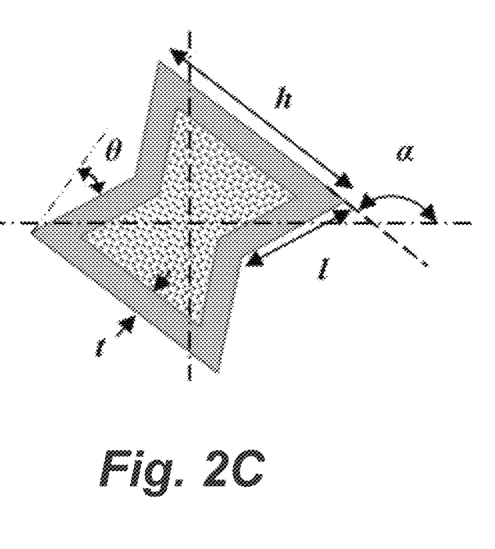
FIG. 2C illustrates a structural unit of the second section, according to an embodiment of the present invention.

FIG. 2A illustrates an auxetic structural member having sections of different orientations. FIG. 2B illustrates a structural unit 101 of the first section. FIG. 2C illustrates a structural unit 101 of the second section. The auxetic structural member 200 includes a first section 201 and a second section 202. The top layer 110 and the bottom layer 111 of homogenous material are provided in the structural member 200. The auxetic structural member 200 includes a layer 203 provided between the first section 201 and the second section 202. The layer 203 is a layer of a homogeneous material.

The angle α of the structural units 101 of the first section 201 is different from the angle α of the structural units 101 of the second section 202. The layer 203 separates the first section 201 from the second section 202. The layer 203 acts as a binder between the two sections 201 and 202 oriented at different angles of α. The sections 201 and 202 do not come directly in contact with each other as meshing them together is unsuitable for the objective of increasing the strength and stability. In an embodiment, if orientation of the sections 201 and 202 are compatible and fit into each other, then the homogeneous layer 203 is not provided. The top layer 110 and the bottom layer 111 are necessarily provided for imparting a uniform surface for load bearing and a uniform resting surface irrespective of the bottom-most section. In an embodiment, a structure with n sections includes n−1 homogenous layers, wherein n ranges from 1 to any positive integer.

The sections 201 and 202 provided at different angles of α improve load distribution as repercussions due to load faced by the first section is not similar to the repercussions faced by the second section, and it is reduced in the second section. In an embodiment, the sections can include different materials of the structural units (101) and different packing materials (104). Material of structural units (101) of the sections include but not limited functionally varying tensile materials. In an embodiment, shape of the sections includes but not limited to rectangular, any generic shape.

In an embodiment, as shown in the figure, the structural unit 101 of the first section 201 is oriented at an angle α of 45° and the structural unit 101 of the second section 202 is oriented at an angle α of 135°. The outer frame has a span of 408 mm and a width of 108 mm and is 4 mm thick. The layer (203) in between the 2 sections has a thickness of 2 mm.

Figure 3:
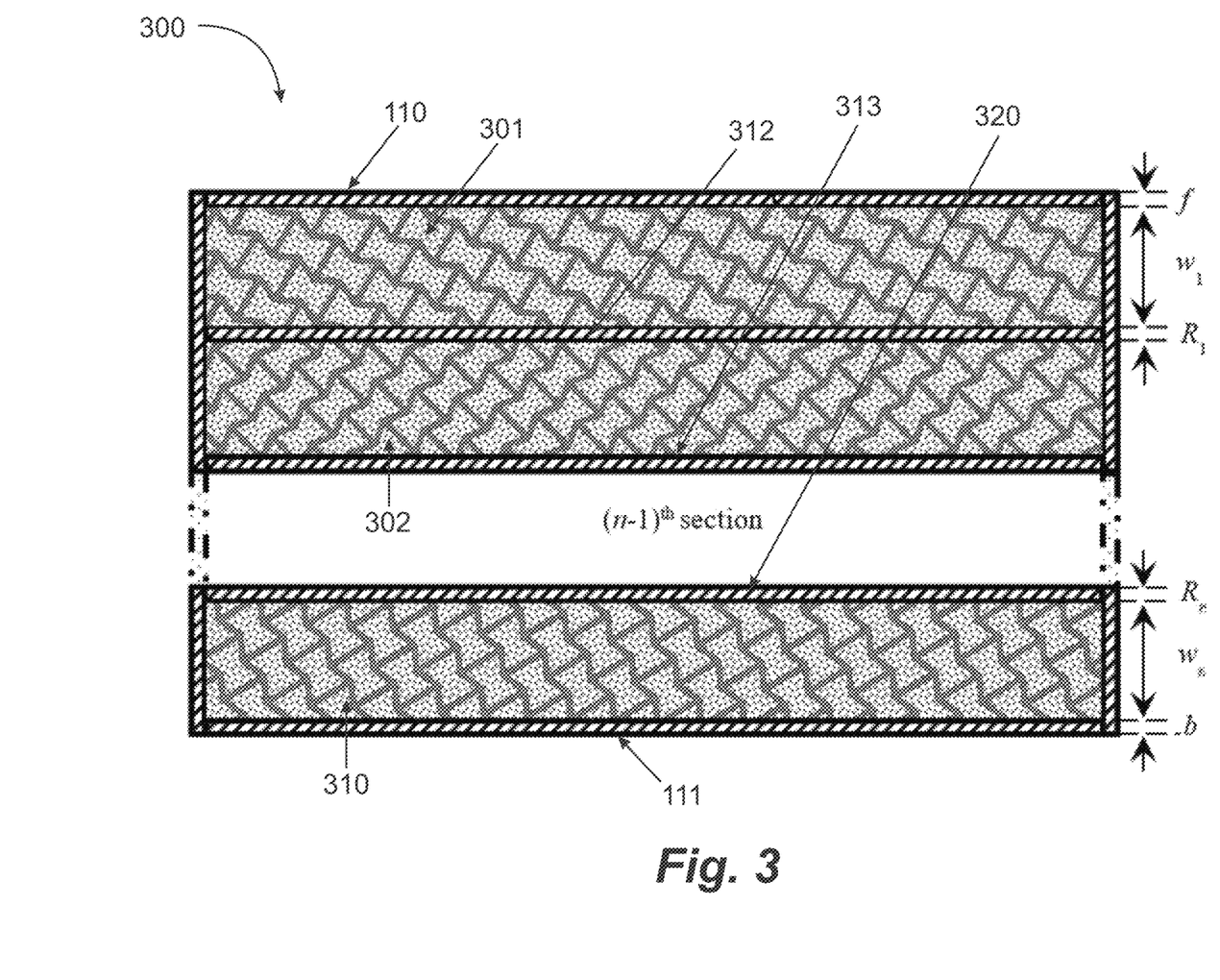
FIG. 3 illustrates an auxetic structural member 300 including a plurality of sections, according to an embodiment of the present invention.

FIG. 3 illustrates an auxetic structural member 300 including a plurality of sections. The auxetic structural member 300 includes a first section 301, a second section 302, a plurality of number of sections (not shown in figure) and a last ($n^{th}$) section 310. The top layer 110 includes a wall thickness of 'f' and the bottom layer 111 includes a wall thickness of 'b'. The structural units 101 of the plurality of sections 301, 302, till 310 include different angles of α, thereby improving the load bearing capacity of the structural member 300. The dimensional parameters of the structural units 101 can vary from section to section, or remain same, for providing additional flexibility in strength. Thickness w of the sections ranging from $w_1$ of the first section 301 to $w_n$ of the last section 310 can be varied. Layers (312, 313, till 320) of homogeneous material are provided between the sections 301, 302 till 303 for separating and binding the sections. The layer 312 is provided between the first section 301 and the section 302, wherein the section 312 includes a thickness of $R_1$. The layers 312, till 320 include thickness of $R_1$ to $R_n$, wherein n is the number of the last layer. In an embodiment, the thickness of all the layers can be different based on orientation and binding between adjacent sections.

Figure 4:
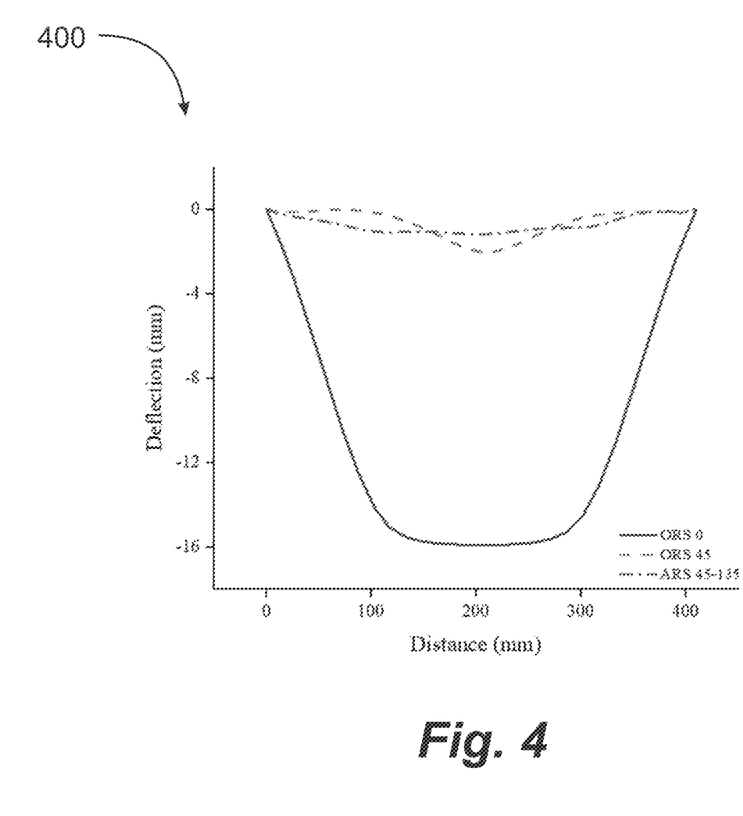
FIG. 4 illustrates a graph between distance and deflection for load applied on an auxetic structural member without fillers, according to an embodiment of the present invention.

FIG. 4 illustrates a graph between distance and deflection for load applied on an auxetic structural member without fillers. The analysis includes two auxetic structural members without packing material. The first auxetic structural member includes a single section having structural units oriented at an angle α and this structural member is called as an Oriented Re-entrant Structure (ORS), hereinafter defined as ORS. The second structural member includes plurality of sections with structural units oriented at different angles of α and called as Assorted Re-entrant Structures (ARS), hereinafter defined as ARS. A load of 1000 N (compressive) is applied as a 4-point loading in which plane stress assumptions are invoked. The structural member is supported by pin supports at both the ends. The structure is analyzed using ABAQUS 6.14. and meshing with CPS4R; 4 node, plane stress quadrilateral.

Distance (mm) in x-axis refers to the distance from left most side of the structural member to the right most side of the structural member. The deflection in Y-axis refers to the deflection obtained in mm, obtained on the distance of the structural member on application of the load. The deflection is observed for the bottom-most horizontal fiber of the structural member.

The straight U curve is obtained for a conventional ORS wherein the structural units are oriented at an angle α=0°. Here, the deflection increases starting from left most end, is maximum at the central distance of 200 mm and the reduces till the right most end.

The dashed line wavy curve is obtained for an ORS wherein the structural units are oriented at an angle α=45°. The deflection of the structural member is far reduced than the conventional ORS but is increasing and decreasing at a smaller extent.

The dashed and dotted line curve is obtained for an ARS wherein the structural units are oriented at an angle α=45° in a first section and at an angle α=135° in a second section. The curve maintains constant minimum deflection throughout the distance of the structural member, A beam spanning a distance of about 408 mm is analyzed. In the analysis material used for structural units is Aluminum with a Young's modulus of 68 GPa and a material Poisson's ratio of 0.36. The material may be changed as per the requirement.

Figure 5A:
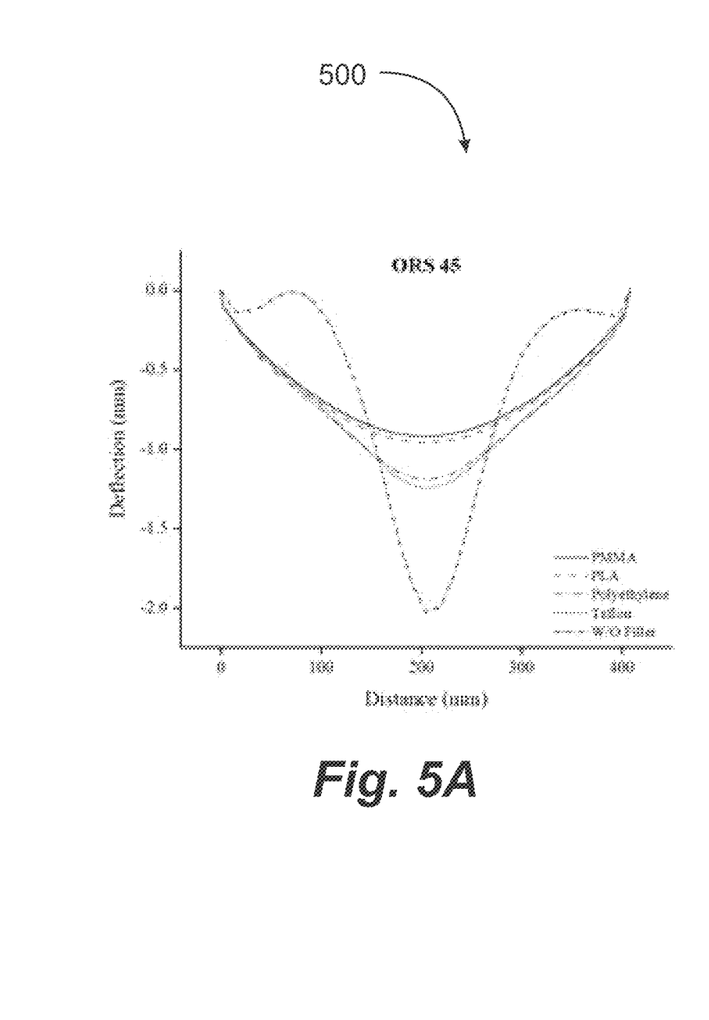
FIG. 5A illustrates a graph between distance and deflection of ORS (45°) for various packing materials, according to an embodiment of the present invention.

FIG. 5A illustrates a graph between distance and deflection of ORS (45°) for various packing materials. Structural members having different packing materials in an ORS having an angle α of 45° are analyzed. The analyzed structures include packing materials of PMMA, PLA, Polyethylene, Teflon and a structural member without the packing material. The analysis is performed with packing material filled in all the voids of all the structural units.

As shown in the graph, the ORS (45) without packing material produces the maximum deflection, while the other structures with packing materials produce considerably minimal deflection. The ORS (45) with PMMA as the packing material produces the minimum deflection.

Figure 5B:
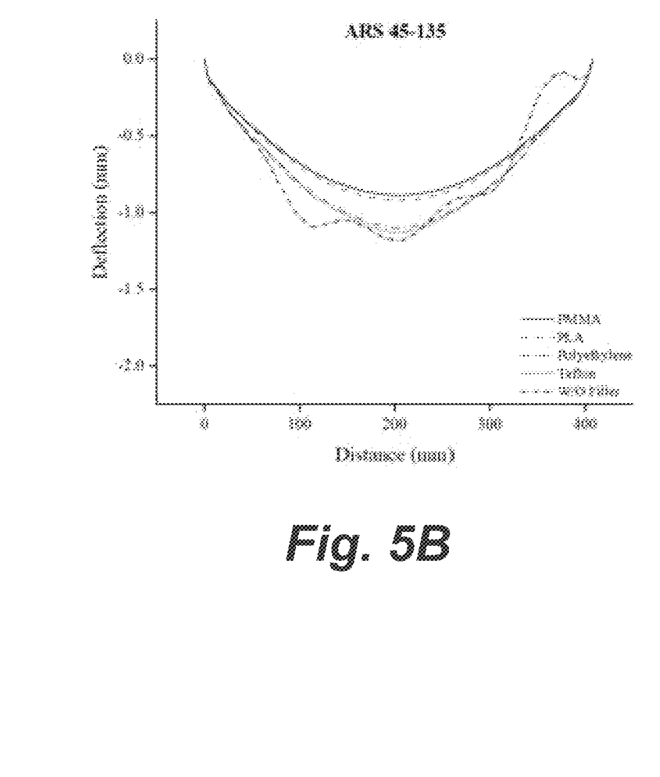
FIG. 5B illustrates a graph between distance and deflection of ARS (45°, 135°) for various packing materials, according to an embodiment of the present invention.

FIG. 5B illustrates a graph between distance and deflection of ARS (45°, 135°) for various packing materials. Structural members having different packing materials in an ARS having an angle α of 45° in a first section and an angle α of 135° in a second section are analyzed. The analyzed structures include packing materials of PMMA, PLA, Polyethylene, Teflon and a structural member without the packing material. The analysis is performed with packing material filled in all the voids of all the structural units.

As shown in the graph, the ARS (45°, 135°) without packing material produces the maximum deflection, while the other structures with packing materials produce considerably minimal deflection. Further, as seen in FIG. 5A and FIG. 5B, the deflection produced in the structural members of ARS (45°, 135°) is considerably lesser than the deflection produced in structural members of the ORS (45). Structural members of ARS (45°, 135°) produced a maximum deflection of 0.9 mm, which is far lesser than the maximum deflection of 2 mm produced in structures of ORS (45). Structural member of ARS (45°, 135°) with PMMA as the packing material produces the minimum deflection.

Introduction of suitable packing materials in voids of the structural units produces significant improvement in performance and deflection characteristics of a beam. The maximum deflection is reduced, and characteristics of the beam are stabilized thus reducing spikes in deflection. Furthermore, the packing material need not be filled into every void. They can be placed so as to extract maximum benefits by not compromising on the mass consumption. The packing material can also be varied with each section.

Varied amounts of strength and stability can be achieved by positioning the packing materials at certain points and not filling the entire voids of the structural units.

Figure 6:
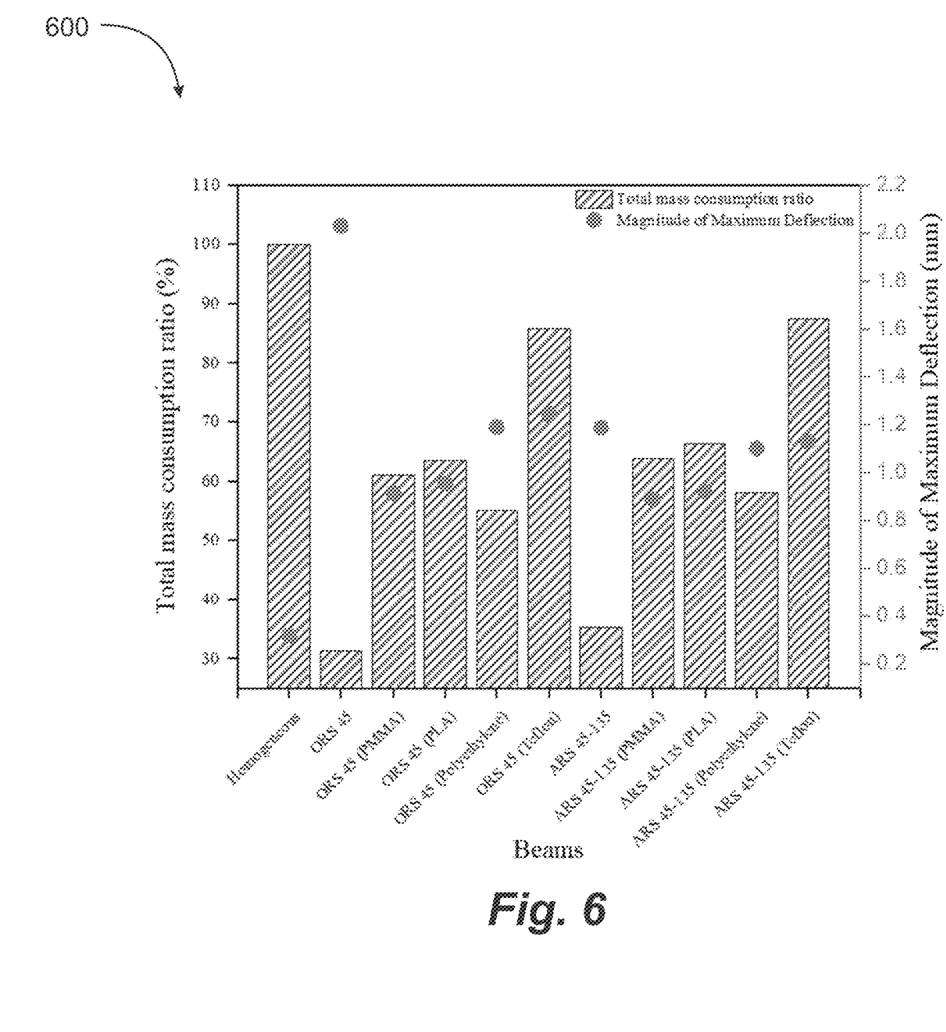
FIG. 6 illustrates a graph for comparison of beams of various structural members having different packing materials with respect to their mass consumption ratio in % and magnitude of maximum defection in mm, according to an embodiment of the present invention.

FIG. 6 illustrates a graph for comparison of beams of various structural members having different packing materials with respect to their mass consumption ratio in % and magnitude of maximum defection in mm Introduction of packing material provides superior mechanical properties, but also increases overall weight of the structure. The additional weight is dependent on manner of packing material provided inside the voids and the packing material. Larger mass consumption increases the weight of the structure and generates huge amounts of waste during manufacturing and disposal. Selective filling of voids with a suitable packing material reduces weight of the structures. Total mass consumption ratio here is defined as ratio of mass of auxetic beam to mass of homogeneous beam. Total mass consumption ratio provides a measure of total material consumption in an auxetic beam as compared to that of a homogeneous beam.

To assess reduction in usage of mass, total mass consumption ratio is calculated as shown below. Taking an example of one particular embodiment, that is, the ARS 45-135, the calculation is as shown.

$$\text{Total mass consumption ratio} = \frac{\text{Mass of Auxetic beam}}{\text{Mass of homogeneous beam}}$$

Mass of the equivalent homogeneous beam (calculated keeping the overall dimensions same as that of the auxetic designs; for Aluminum as material) is 0.119 kg. Mass of the auxetic design for ARS 45-135 is found to be 0.042 kg for Aluminum as material. In the given example, the total mass consumption ratio for the auxetic design for ARS 45-135 is estimated as 35.294%.

The structural members analyzed are homogenous beams, beams with ORS 45 without packing material, ORS 45 with PMMA as packing material ORS 45 with PLA as packing material, ORS 45 with Polyethylene as packing material, ORS 45 with Teflon as packing material, ARS 45-135 without packing material, ARS 45-135 with PMMA as packing material, ARS 45-135 with PLA as packing material, ARS 45-135 with Polyethylene as packing material and ARS 45-135 with Teflon as packing material.

Clearly, as seen in the graph 600, homogenous beam produces least magnitude of deflection but with highest percentage of total mass consumption ration.

Figure 7A:
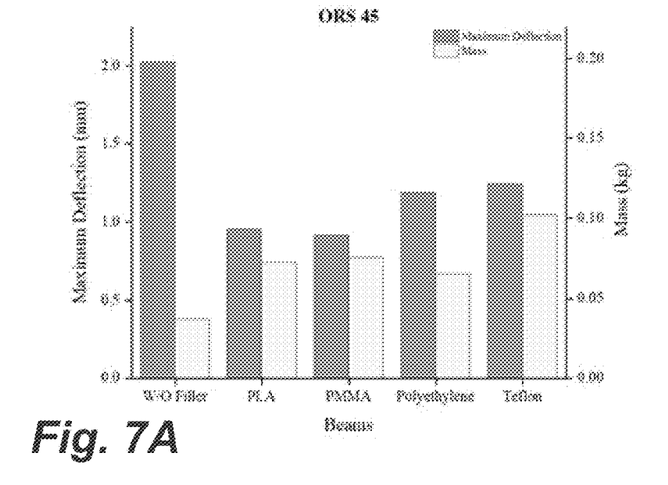
FIG. 7A illustrates a graph for beams of ORS 45 with different packing materials and their corresponding maximum deflection in mm and mass in kg, according to an embodiment of the present invention.

FIG. 7A illustrates a graph for beams of ORS 45 with different packing materials and their corresponding maximum deflection in mm and mass in kg.

Figure 7B:
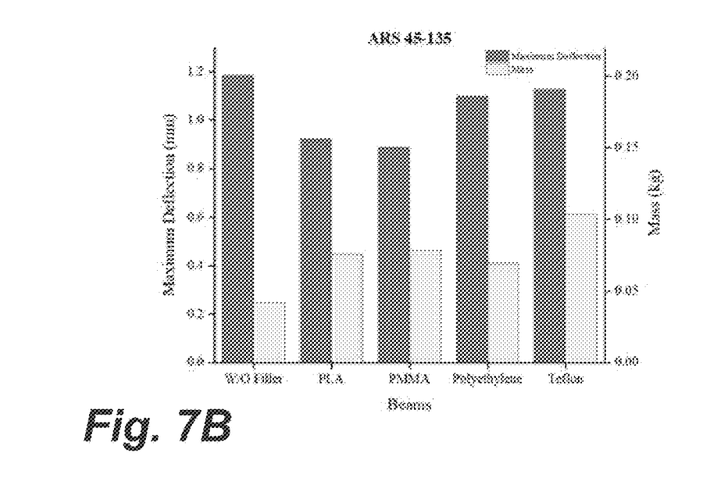
FIG. 7B illustrates a graph for beams of ARS 45-135 with different packing materials and their corresponding maximum deflection in mm and mass in kg, according to an embodiment of the present invention.

FIG. 7B illustrates a graph for beams of ARS 45-135 with different packing materials and their corresponding maximum deflection in mm and mass in kg.

A main advantage of the present invention is that the auxetic member provides improved load bearing capacity of load bearing structures. Another advantage of the present disclosure is that the auxetic member provides a sustainable structure with reduced material consumption and reduced material wastage. Still another advantage of the present disclosure is that the auxetic member provides a structure with customizable re-entrant auxetic sections. Yet another advantage of the present disclosure is that the auxetic member provides a structure with improved deformation resistance.

Another advantage of the present disclosure is that the auxetic member provides a structure with reduced weight and improved mechanical properties. Still another advantage of the present disclosure is that the auxetic member provides a structure suitable for directional loading.

Yet another advantage of the present disclosure is that the auxetic member provides a structure with improved deflection characteristics under bending conditions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An auxetic member for load bearing structures, comprising:
a plurality of sections vertically stacked, each section having a width and including a plurality of structural units having ribs with parallel surfaces and ribs with reentrant surfaces, the ribs of each structural unit enclosing a void with parallel surfaces oriented at an angle α relative to a horizontal plane, the void filled with packing material for improving load bearing capacity, Young's modulus of the packing material lower than Young's modulas of the material of the ribs;
a top layer having a first thickness provided at a top end of an uppermost section and a bottom layer having a second thickness, different than the first thickness, at a bottom end of a lowermost section.

2. An auxetic member for load bearing structures, comprising:
a section including a plurality of structural units;
a top layer provided at a top end of the section and a bottom layer provided at a bottom end of the section;
wherein the structural units include ribs with parallel surfaces and ribs with re-entrant surfaces;
wherein the ribs with parallel surfaces of the structural units are oriented at an angle α relative to a horizontal plane, the structural unit including a void enclosed by the ribs with parallel surfaces and ribs with re-entrant surfaces;
characterized in that the void of the structural units is filled with a packing material for improving load bearing capacity, and wherein the packing material bonds with ribs of the void by the packing material being chemically reactive towards material of the ribs, thereby forming a stable bond.

3. An auxetic member for load bearing structures, comprising:
a section including a plurality of structural units;
a top layer provided at a top end of the section and a bottom layer provided at a bottom end of the section;

wherein the structural units includes ribs with parallel surfaces and ribs with re-entrant surfaces;

wherein the ribs with parallel surfaces of the structural units are oriented at an angle α relative to a horizontal plane, the structural unit including a void enclosed by the ribs with parallel surfaces and ribs with re-entrant surfaces;

characterized in that the void of the structural units is filled with a packing material for improving load bearing capacity and the packing material filled in the void is disjoint from the ribs of the void.

4. An auxetic member for load bearing structures, comprising:

a plurality of sections vertically stacked, each section having a width and including a plurality of structural units having ribs with parallel surfaces and ribs with reentrant surfaces, the ribs of each structural unit enclosing a void with parallel surfaces oriented at an angle α relative to a horizontal plane, the void filled with packing material for improving load bearing capacity;

a top layer having a first thickness provided at a top end of an uppermost section and a bottom layer having a second thickness at a bottom end of a lowermost section;

characterized in that the first thickness and the second thickness are of a different thickness, and in that the angle α is different between the structural units of different sections for improving load distribution.

5. The auxetic member as claimed in claim 4, further comprising a layer of homogenous material between the sections, separating and binding the sections with structural units of different angle α.

6. The auxetic member as claimed in claim 5 wherein a thickness (R) of the layer of homogeneous material ibetween the sections is different based on orientation of the structural units and binding between the sections.

7. An auxetic member fir load bearing structures, comprising:

a plurality of sections vertically stacked, each section having a width and including a plurality of structural units having ribs with parallel surfaces and ribs with reentrant surfaces, the ribs of each structural unit enclosing a void with parallel surfaces oriented at an angle α relative to a horizontal plane, the void filled with packing material for improving load bearing capacity;

a top layer having a first thickness provided at a top end of an uppermost section and a bottom layer having a second thickness, different than the first thickness, at a bottom end of a lowermost section;

characterized in that the structural unit includes parameters of cell angle (θ), rib thickness (t), slant rib length (l) and horizontal rib length (h) and the parameters are variable between the structural units of different sections.

8. An auxetic member for load bearing structures, comprising:

a plurality of sections vertically stacked, each section having a width and including a plurality of structural units having ribs with parallel surfaces and ribs with reentrant surfaces, the ribs of each structural unit enclosing a void with parallel surfaces oriented at an angle α relative to a horizontal plane, the void filled with packing material for improving load bearing capacity;

a top layer having a first thickness provided at a top end of an uppermost section and a bottom layer having a second thickness, different than the first thickness, at a bottom end of a lowermost section;

characterized in that the packing material is different between the structural units of different sections.

* * * * *